(12) United States Patent
Son et al.

(10) Patent No.: US 9,318,233 B2
(45) Date of Patent: Apr. 19, 2016

(54) METHOD FOR MANUFACTURING CONDUCTIVE METAL THIN FILM USING CARBOXYLIC ACID

(75) Inventors: Won Il Son, Daejeon (KR); Sun Jin Park, Daejeon (KR); Eui Duk Kim, Daejeon (KR); Seok Heon Oh, Daejeon (KR); Joo Ho Moon, Seoul (KR); Kyoo Hee Woo, Seoul (KR); Dong Jo Kim, Suwon-si (KR)

(73) Assignees: Hanwha Chemical Corporation, Seoul (KR); Industry-Academic Cooperation Foundation, Yonsei University, Seoul (KR)

(*) Notice: Subject to any disclaimer, the term of this patent is extended or adjusted under 35 U.S.C. 154(b) by 0 days.

(21) Appl. No.: 13/503,908

(22) PCT Filed: Oct. 26, 2010

(86) PCT No.: PCT/KR2010/007371
§ 371 (c)(1),
(2), (4) Date: Apr. 25, 2012

(87) PCT Pub. No.: WO2011/052966
PCT Pub. Date: May 5, 2011

(65) Prior Publication Data
US 2012/0219703 A1 Aug. 30, 2012

(30) Foreign Application Priority Data
Oct. 26, 2009 (KR) .................. 10-2009-0101696

(51) Int. Cl.
| | |
|---|---|
| *B05D 5/12* | (2006.01) |
| *H01B 1/22* | (2006.01) |
| *B22F 3/22* | (2006.01) |
| *B22F 3/24* | (2006.01) |
| *B82Y 30/00* | (2011.01) |
| *C09C 1/62* | (2006.01) |
| *C09D 5/24* | (2006.01) |
| *C09D 7/12* | (2006.01) |
| *C09D 11/52* | (2014.01) |
| *C08K 3/08* | (2006.01) |
| *C08K 9/04* | (2006.01) |

(52) U.S. Cl.
CPC .. *H01B 1/22* (2013.01); *B22F 3/22* (2013.01); *B22F 3/24* (2013.01); *B82Y 30/00* (2013.01); *C09C 1/62* (2013.01); *C09C 1/627* (2013.01); *C09D 5/24* (2013.01); *C09D 7/1225* (2013.01); *C09D 11/52* (2013.01); *B22F 2998/10* (2013.01); *C01P 2004/03* (2013.01); *C01P 2004/64* (2013.01); *C01P 2006/40* (2013.01); *C08K 3/08* (2013.01); *C08K 9/04* (2013.01)

(58) Field of Classification Search
CPC ............. B05D 5/12; B05D 3/02; B22F 3/22; B22F 3/24; C09C 1/62; C09C 1/627
USPC ......................................................... 427/123
See application file for complete search history.

(56) References Cited

U.S. PATENT DOCUMENTS

| | | | |
|---|---|---|---|
| 4,430,128 A | 2/1984 | Frenier et al. | |
| 5,173,130 A | 12/1992 | Kinoshita et al. | |
| 5,213,622 A | 5/1993 | Bohling et al. | |
| 2003/0180451 A1* | 9/2003 | Kodas et al. | ................... 427/123 |
| 2004/0048177 A1* | 3/2004 | Tamoto et al. | ............... 430/58.2 |
| 2007/0051927 A1* | 3/2007 | Itoh et al. | ....................... 252/500 |
| 2008/0000416 A1 | 1/2008 | Miyoshi et al. | |
| 2008/0241391 A1* | 10/2008 | Kim et al. | ...................... 427/256 |
| 2008/0286488 A1 | 11/2008 | Li et al. | |
| 2009/0162779 A1* | 6/2009 | Nair et al. | ................ 430/137.14 |
| 2009/0169892 A1 | 7/2009 | Bazzi et al. | |
| 2012/0125659 A1* | 5/2012 | Nakako et al. | .............. 174/126.1 |

FOREIGN PATENT DOCUMENTS

| | | | | |
|---|---|---|---|---|
| JP | 2009530497 A | | 8/2009 | |
| KR | 10-2006-0096111 A | | 9/2006 | |
| WO | WO 2009078448 A1 * | | 6/2009 | ................. 174/126.1 |

* cited by examiner

*Primary Examiner* — Austin Murata
(74) *Attorney, Agent, or Firm* — The Webb Law Firm

(57) ABSTRACT

The present invention relates to a method for manufacturing a conductive metal thin film, including: preparing a conductive metal coating solution by adding carboxylic acid to a dispersion including a conductive metal particle having a core/shell structure; coating the conductive metal coating solution on a top portion of a substrate, heat-treating it, and removing an metal oxide layer of the surface of the conductive metal particle having the core/shell structure; and forming a thin film of the conductive metal particle from which the metal oxide layer is removed.

10 Claims, 6 Drawing Sheets

METHOD FOR MANUFACTURING CONDUCTIVE METAL THIN FILM USING CARBOXYLIC ACID

TECHNICAL FIELD

The present invention relates to a technology relating to a method for manufacturing a conductive metal thin film with improved conductivity and sintering property by forming a film on a top portion of a substrate by using a conductive metal coating solution obtained by adding carboxylic acid to a dispersion including conductive metal particles having a core/shell structure.

BACKGROUND ART

Recently, a photolithography method based on exposure and etching processes has been mainly used to manufacture micro structures, for example, a metal pattern, an insulating layer, a separation membrane, etc., in manufacturing electric/electronic components. However, the photolithography is an energy-intensive and high-cost production technology that requires a multi-stage composite manufacturing process. Further, gas, waste water, etc., are discharged during the exposure and etching processes, thereby causing environmental pollution. Therefore, a demand for the development of a simple, low-cost, and environmental-friendly technology capable of replacing the photolithography method based on the exposure and etching processes has been rapidly increased.

Therefore, the photolithography process has a great advantage in making the process simple in that it is possible to pattern a conductive polymer liquid-phase material, such as poly (ethylenedioxythiophene) doped with poly(styrene sulfonic acid) (PEDOT/PSS), by a solution process, such as an inkjet printing process, a screen printing process, etc. However; the conductivity of the PEDOT/PSS conductive polymer is deteriorated significantly more than that of the metal material.

Therefore, research into developing a metal material having excellent conductivity as a liquid-phase material is urgently needed in order to apply a solution process, such as spin coating, dip coating, droplet casting, inkjet printing, screen printing, etc., to the metal material, all of which are simple in terms of the process and easy to form the pattern. As a simple example, a process of forming the metal material as nano particles and dispersing metal particles in a specific solvent has been in the limelight. When the metal particles are synthesized at a nano scale, the sintering temperature of the metal material may be remarkably lowered, which provides a basis capable of forming a conductive film for an electrode through low-temperature heat treatment at a temperature of 300° C. or less. Therefore, the particles may be fused even at a temperature of 300° C. or less according to the size thereof, the dense metal film may be naturally obtained, and the electric resistance value of the metal film is lowered.

However, in the case of copper that is a low-cost electrode material, the size of particles is also an important consideration, but copper has a thermodynamically oxidized property, which is an obstacle for a sintering behavior at the time of heat treatment, such that it is difficult to obtain the high conductive film. In the case of silver or gold used as an electrode material in the past, it does not have a problem of oxidization but the use thereof is limited due to high cost. Therefore, in order to use copper, that is a high conductive material, as the electrode, it is necessary to remove or reduce copper oxide.

DISCLOSURE OF INVENTION

Technical Problem

An object of the present invention is to provide a method for manufacturing a conductive metal thin film with excellent conductivity and sintering property by dispersing conductive metal nano particles which can easily be oxidized, such as copper, aluminum, etc., in a specific solvent, adding carboxylic acids to induce physical and chemical adsorption of metal oxide and carboxylic acid, and forming a metal thin film from which an metal oxide layer on a surface of metal oxide is removed.

Solution to Problem

In one general aspect, a method for manufacturing a conductive metal thin film includes: preparing a conductive metal coating solution by adding carboxylic acid to a dispersion including a conductive metal particle having a core/shell structure; coating the conductive metal coating solution on a top portion of a substrate, heat-treating it, and removing an metal oxide layer of the surface of the conductive metal particle having the core/shell structure; and forming a thin film of the conductive metal particle from which the metal oxide layer is removed.

Hereinafter, the present invention will be described in detail.

The present invention uses a solution obtained by adding carboxylic acid to a dispersion including a conductive metal particle having a core/shell structure as a conductive metal coating solution in order to form a conductive metal thin film on a top portion of a substrate.

As a result of numerous studies on a conductive metal liquid-phase material suitable for a solution process for forming a conductive metal thin film by inventors of the present invention, a method for forming a high-efficiency conductive metal thin film was developed by using the conductive metal coating solution obtained by adding carboxylic acid to a dispersion including a conductive metal particle.

The present invention can use a metal-based material including a metal nano particle, a metal oxide nano particle, a metal nano particle having core/shell structure, organic metal compound, etc., as a type of a conductive metal particle applicable to the conductive metal coating solution. Preferably, it is most efficient to use the metal nano particle having the core/shell structure. The conductive metal particle may be applied to all metal elements having conductivity, preferably, copper (Cu), aluminum (Al), nickel (Ni), cobalt (Co), and molybdenum (Mo) and an alloy thereof and a composite thereof, etc., most preferably, copper. The surface native metal oxide layer is easily formed in the above conductive metal particle, such that the electric conductivity is degraded. Therefore, removing the metal oxide layer is the most important to improve the electric conductivity and the sintering property.

The metal particles contacts oxygen or moisture in the air during the material process or after the material process in the air, such that they are naturally oxidized. The oxidation hinders the sintering progress and is difficult to reveal the high conductivity. In addition, after the metal film is made of the liquid-phase material, the oxidation is more rapidly progressed at the heat treatment under the low vacuum or air atmosphere, such that the conductivity is not revealed. In particular, in order to obtain the excellent conductivity and the sintering property, the structure of the metal nano particle is required. On the other hand, the nano particle has more rapid oxidation speed and when being oxidized, the amount of oxygen forming the metal oxide layer is increased corresponding to the high surface area, thereby having a bad effect on the conductivity and the sintering property.

Therefore, the present invention proposes a method of adding organic acid, i.e., carboxylic acids to a dispersion including the conductive metal particle in order to use the conductive metal thin film as an electrode requiring the high conductivity. The sintering property and the conductivity of the conductive metal coating solution prepared by adding the carboxylic acids to the dispersion including the conductive metal particle of the present invention are improved by reducing the metal oxide by physically and chemically adsorbing the metal particle oxide and the carboxylic acids or forming the conductive metal thin film from which the metal oxide layer is removed. In addition, the conductive metal coating solution to which the carboxylic acid is added obtains a surprising effect capable of revealing the excellent conductivity in the air or at the time of heat treatment under the low vacuum. In particular, the process is efficient in the case where it is applied to the conductive metal particle having the core/shell structure. It is the most efficient for the copper nano particle having the core/shell structure among the above listed metal particles. The mechanism for forming the copper nano particle having the core/shell structure will be described below in more detail.

As the carboxylic acid contained in the conductive metal coating solution of the present invention, it is preferable to use one or more selected from saturated mono-carboxylic acid, unsaturated carboxylic acid, di-carboxylic acid, and tri-carboxylic acid. As the example, it is most preferable to use the saturated mono-carboxylic acid such as formic acid, acetic acid, propionic acid, etc., unsaturated carboxylic acid such as acrylic acid, etc., di-carboxylic acid such as malonic acid, oxalic acid, etc., and tri-carboxylic acid such as citric acid.

The dispersion including the conductive metal particle having the core/shell structure of the present invention, preferably has 40 wt % of concentration and the minimum addition of the carboxylic acid added to the dispersion including the conductive metal particle having the core/shell structure is an amount capable of completely coating the surface of the metal particle. It is preferable to add 0.01 to 30 wt % of carboxylic acid for the metal particle contained in the dispersion. When the carboxylic acid is added less than 0.01 wt %, it is difficult to expect the effects obtained by adding the carboxylic acid and when the carboxylic acid is added exceeding 30 wt %, it is difficult to increase the content of the metal particle and thus, to secure the sufficient conductivity. It is more preferable to add 0.1 to 10 wt % of carboxylic acid for the metal particle contained in the dispersion.

The dispersion including the conductive metal particle having the core/shell structure includes the conductive metal particle, the organic solvent, and the dispersant. In the composition ratio of the dispersion including the conductive metal particle having the core/shell structure, a ratio of (a) 5 to 40 wt % of conductive metal particle, (b) 50 to 90 wt % of organic solvent, and (c) 1 to 10 wt % of dispersant is mixed.

The organic solvent is not specifically limited but it is preferable to use the solvent that can be mixed (or dissolved) with the carboxylic acid. For example, as a polar solvent, one or more selected from ethylene glycol, methyl alcohol, isopropyl alcohol, deionized water, methoxyethanol, glycerol, etc., may be used and as a non-polar solvent, one or more selected from acetone, toluene, methylethyl ketone, ethyl acetate, cyclohexane, butyl lactate, butyl carbitol acetate, etc., may be used.

As the dispersant, one or more selected from an anionic dispersant such as dibutyl sebacate (DBS), sodium dodecyl sulfate (SDS), sodium bis (2-ethylhexyl) sulfosuccinate (AOT), etc., a anionic dispersant, such as cetyltrimethylammonium bromide (CTAB) etc., a non-ionic dispersant, such as triton X-100, tween 20, etc., a polymer electrolyte dispersant such as poly (acrylic acid) (PAA), poly styrene-alt-maleic acid (PSM), etc., poly (styrene-co-acrylic acid) (PSA), and ethylenediaminetetraacetic acid (EDTA), citric acid, etc., may be used.

The present invention may use a solution coating process such as, spin coating, dip coating, inkjet, droplet casting, inkjet printing, screen printing, felxo, gravure, off-set, etc., in order to form the conductive metal film on the top portion of the substrate by using the conductive metal coating solution and is not limited to only the above listed coating process. Therefore, any known solution coating methods may be used.

The present invention applies the conductive metal coating solution on the top portion of the substrate by the coating method and is then heat-treated under the low vacuum or air atmosphere. In the heat-treatment process, the heat-treatment temperature may be 150 to 300° C., preferably 150 to 250° C. Preferably, the heat-treatment time at the heat-treatment temperature may be 0.5 to 1 hour. The heat-treatment process may use a general heat-treatment process such as hot plate or heating air convection, etc., or a heat-treatment method selected from IR lamp, plasma sintering, microwave sintering, and laser sintering, etc.

At the time of heat treatment of the present invention, the low vacuum atmosphere implies $1\times10^{-1} \sim 1\times10^{-3}$ torr.

Hereinafter, the mechanism for forming the conductive metal thin film of the present invention will be described in more detail.

The primary reaction equation of removing the metal oxide layer of the surface of the copper particle by the carboxylic acid is as follows.

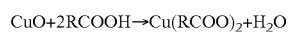
$$CuO+2RCOOH \rightarrow Cu(RCOO)_2+H_2O$$

In addition, the secondary reduction equation of the copper oxide by the carboxylic acid remaining in the copper film physically and chemically adsorbed to the copper particle and other remaining carboxylic acid at the time of heat treatment is as follows.

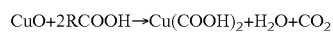
$$CuO+2RCOOH \rightarrow Cu(COOH)_2+H_2O+CO_2$$

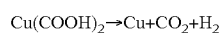
$$Cu(COOH)_2 \rightarrow Cu+CO_2+H_2$$

$$Cu(COOH)_2 \rightarrow Cu+CO+H_2O$$

The by-products CO and $H_2$ of the secondary reaction serve to reduce the copper oxide again. The reaction is as follows.

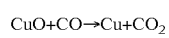
$$CuO+CO \rightarrow Cu+CO_2$$

$$CuO+H_2 \rightarrow Cu+H_2O$$

When the carboxylic acid is added to the copper-based liquid-phase conductive material, the oxide copper component that is a conductive exhibiting fault factor is reduced to copper, such that the specific resistance is shown at the time of heat treatment under the low vacuum or air atmosphere.

In addition, the kind of added carboxylic is very important. Various carboxylic acids, for example, saturated acid such as formic acid and acetic acid, unsaturated acid such as acrylic acid, di-carboxylic acid such as oxalic acid having two carboxyl groups, etc., tri-carboxylic acid such as citric acid having three carboxyl groups, etc., can be applied. However, an effect of reducing the copper oxide to copper was different according to the kind of carboxylic acid. In the case of the liquid-phase formic acid at normal temperature, the number of carboxyl group of pure formic acid (98%), acetic acid (99%), and propionic acid (99%) are the same and only the length of the alkyl group chain is increased. As shown in FIG. 1, the specific resistance of the copper film to which the formic acid among the saturated acids is added is the lowest in all the temperature ranges at the vacuum heat treatment. This implies that the effect of removing the copper oxide or reducing to copper using the formic acid is large. The acetic acid and the propionic acid other than the formic acid are formed of a tail portion having non-polarity and a head portion having polarity. The length of the alkyl chain is lengthened, such that the tail portion having the non-polarity is relatively large. That is, when the molecular weight is increased, since the carboxylic acid has large non-polarity and therefore, Cu of CuO having (+) charge does not relatively actively react with carboxyl group, it is determined that the reduction of the copper oxide does not actively generate in the case where the acetic acid and the propionic acid are included than in the case where the formic acid is added. In addition, in the case of the film where the di-carboxylic acid, i.e., the oxalic acid and the tri-carboxylic acid, i.e., the citric acid are added, there is an effect of reducing and removing the copper oxide of oxalic acid and citric acid in consideration of the specific resistance characteristics of FIG. 1. In particular, the effect of the oxalic acid is very excellent together with the formic acid. The reason why the reduction is actively generated under the formic acid and oxalic acid atmosphere can be appreciated from the above-mentioned secondary reduction reaction equation. $Cu(COOH)_2$ shown in the secondary reduction reaction is well generated at the time of heat treatment under formic acid and oxalic acid atmosphere and easily reduced to copper. On the other hand, most of the citric acid is thermally decomposed to $CO_2$ and $H_2O$ at about 175° C., such that the reduction effect is relatively small at the time of heat treatment.

Advantageous Effects of Invention

According to the present invention, it provides the method of improving the conductivity and the sintering property by reducing the copper oxide component having the core/shell structure to copper and preventing the oxidization. Further, the present invention can save material costs by using low-cost materials such as copper and reduce the process costs of the electrode for applying to the flexible electronic/electric system.

MODE FOR THE INVENTION

Hereinafter, the present invention will be described in more detail with reference to the following examples. However, the following examples describe the present invention by way of example only but are not limited thereto.

EXAMPLE 1

In order to manufacture the coating dispersion including the copper nano particles having 20 wt % of solid fraction, 20 g of copper nano particle having excellent dispersion was mixed with the solvent including 35 g of ethylene glycol as a main solvent and 40 g of methyl alcohol as a sub-solvent and 5 g of sodium bis(2-ethylhexyl) sulfosuccinate (AOT) as a dispersant was mixed therewith. 0.0026 mol of formic acid was added to such a prepared copper liquid-phase material. The solution was uniformly mixed by using sonication and planetary milling, thereby preparing the copper conductive ink. The coating solution was coated on the glass substrate by the droplet casting and was subjected to the heat-treatment process at 200° C. for 30 minutes under the vacuum atmosphere ($10^{-3}$ Torr) and the air atmosphere.

Figure 3:
FIG. 3 is a scanning electron microscope (SEM) photograph showing a surface micro structure after heat treatment (200° C.) under the vacuum atmosphere of Example 1 to which carboxylic acid is added.

After the heat treatment (200° C.) is performed under the vacuum atmosphere, the results obtained by observing the micro structure on the surface of the film of copper nano particle using the scanning electron microscope (SEM) were shown in FIG. 3.

Figure 10:
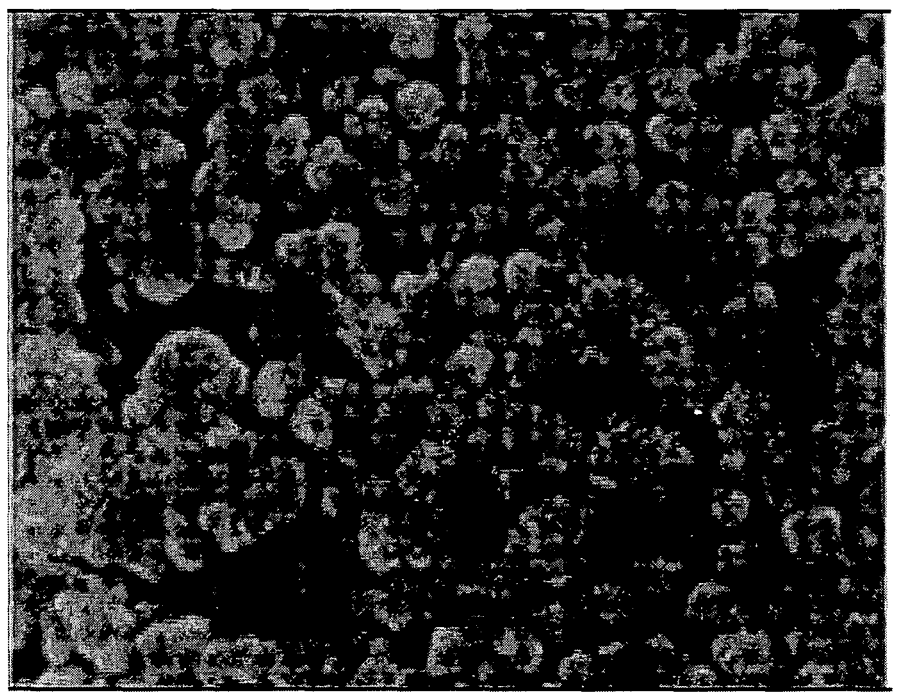
FIG. 10 is a scanning electron microscope (SEM) photograph showing a surface micro structure after heat treatment (200° C.) under the air atmosphere of the copper film (Example 1) to which formic acid is added.

In addition, the scanning electron microscope photograph of the copper nano particle film was shown in FIG. 10.

EXAMPLE 2

Example 2 was performed in the same manner as Example 1 other than the formic acid is changed into the acetic acid.

Figure 4:
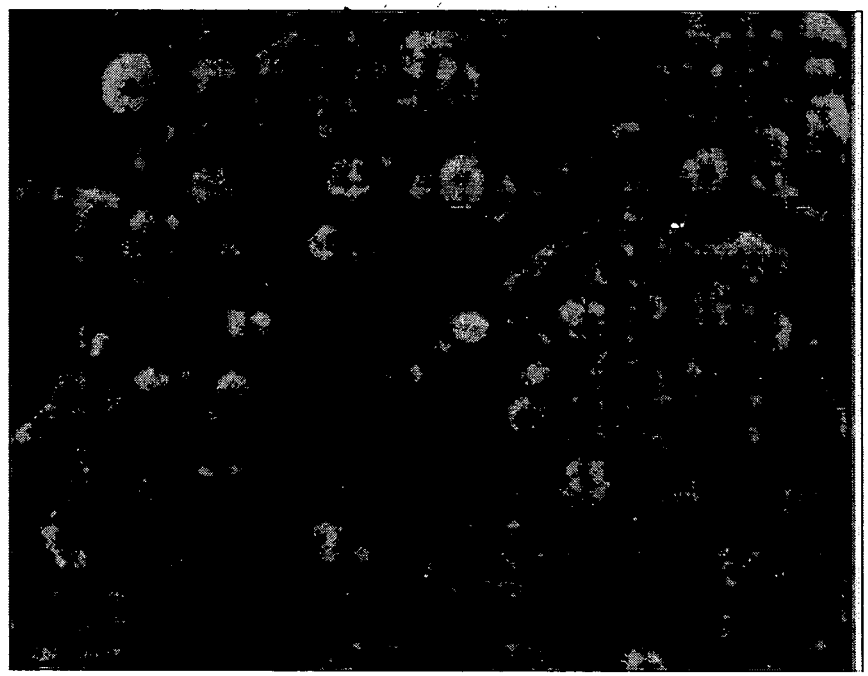
FIG. 4 is a scanning electron microscope (SEM) photograph showing a surface micro structure after heat treatment (200° C.) under the vacuum atmosphere of Example 2 to which acetic acid is added.

After the heat treatment (200° C.) is performed under the vacuum atmosphere, the results obtained by observing the micro structure on the surface of the film of copper nano particle using the scanning electron microscope (SEM) were shown in FIG. 4.

EXAMPLE 3

Example 3 was performed in the same manner as Example 1 other than the formic acid is changed into the propionic acid.

Figure 5:
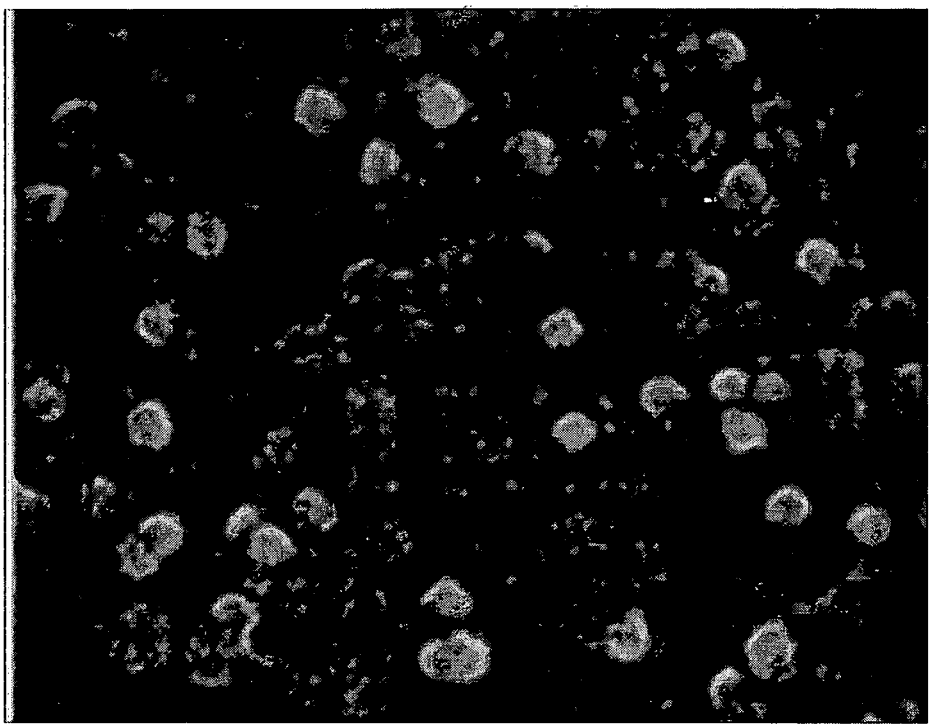
FIG. 5 is the scanning electron microscope (SEM) photograph showing a surface micro structure after heat treatment (200° C.) under the vacuum atmosphere of Example 3 to which propionic acid is added.

After the heat treatment (200° C.) is performed under the vacuum atmosphere, the results obtained by observing the micro structure on the surface of the film of copper nano particle using the scanning electron microscope (SEM) were shown in FIG. 5.

EXAMPLE 4

Example 4 was performed in the same manner as Example 1 other than the formic acid is changed into the oxalic acid.

Figure 6:
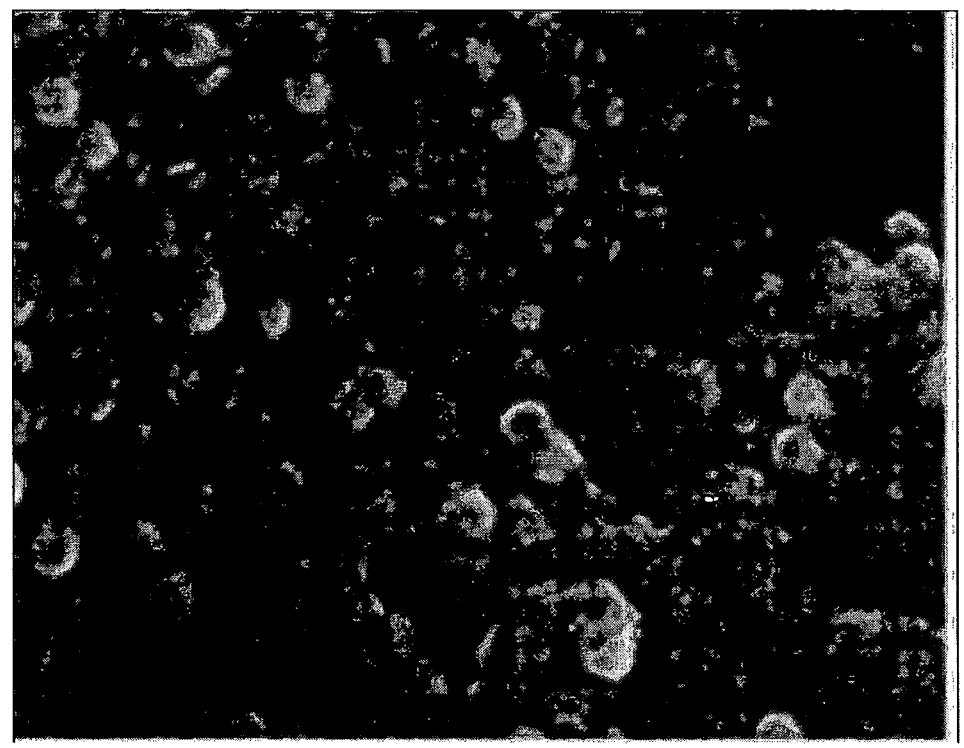
FIG. 6 is a scanning electron microscope (SEM) photograph showing a surface micro structure after heat treatment (200° C.) under the vacuum atmosphere of Example 4 to which oxalic acid is added.

After the heat treatment (200° C.) is performed under the vacuum atmosphere, the results obtained by observing the micro structure on the surface of the film of copper nano particle using the scanning electron microscope (SEM) were shown in FIG. 6.

Figure 11:
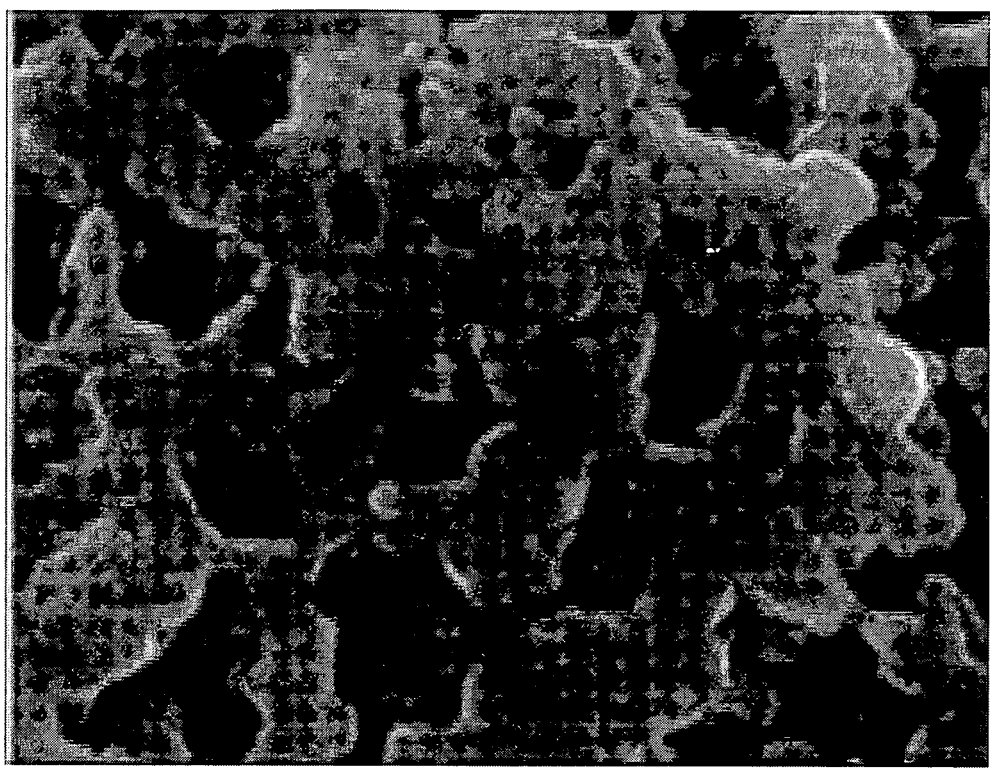
FIG. 11 is a scanning electron microscope (SEM) photograph showing a surface micro structure after heat treatment (200° C.) under the air atmosphere of the copper film (Example 4) to which oxalic acid is added.

In addition, the scanning electron microscope photograph of the copper nano particle film was shown in FIG. 11.

EXAMPLE 5

Example 5 was performed in the same manner as Example 1 other than the formic acid is changed into the citric acid.

Figure 7:
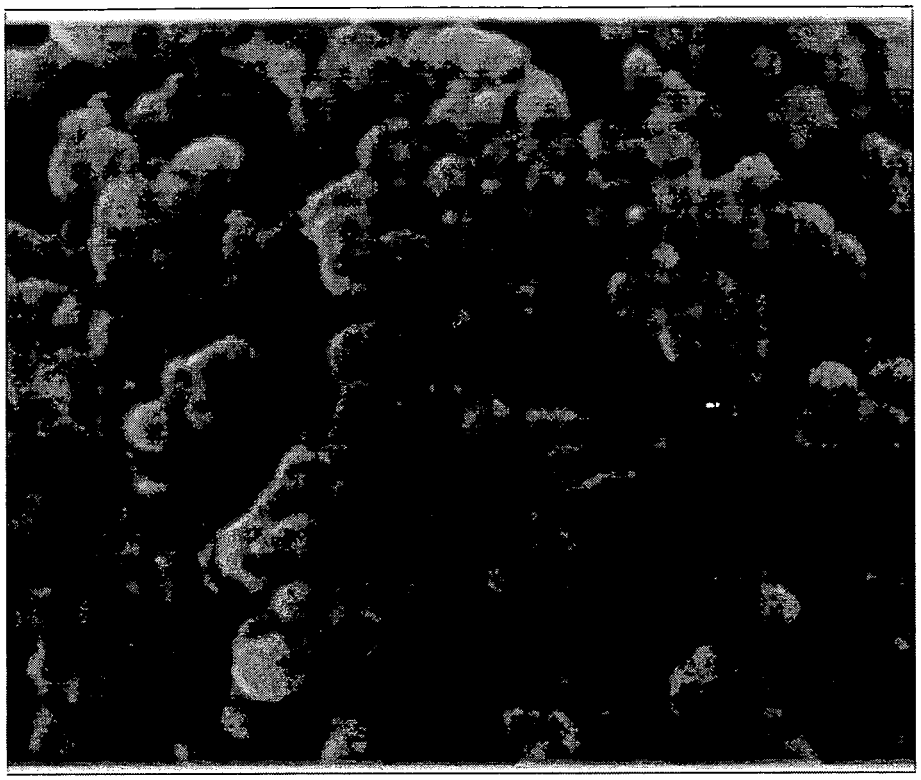
FIG. 7 is a scanning electron microscope (SEM) photograph showing a surface micro structure after heat treatment (200° C.) under the vacuum atmosphere of Example 5 to which citric acid is added.

After the heat treatment (200° C.) is performed under the vacuum atmosphere, the results obtained by observing the micro structure on the surface of the film of copper nano particle using the scanning electron microscope (SEM) were shown in FIG. 7.

COMPARATIVE EXAMPLE 1

Comparative Example 1 was performed under the same condition as Example 1 except that the formic acid was not added.

Figure 2:
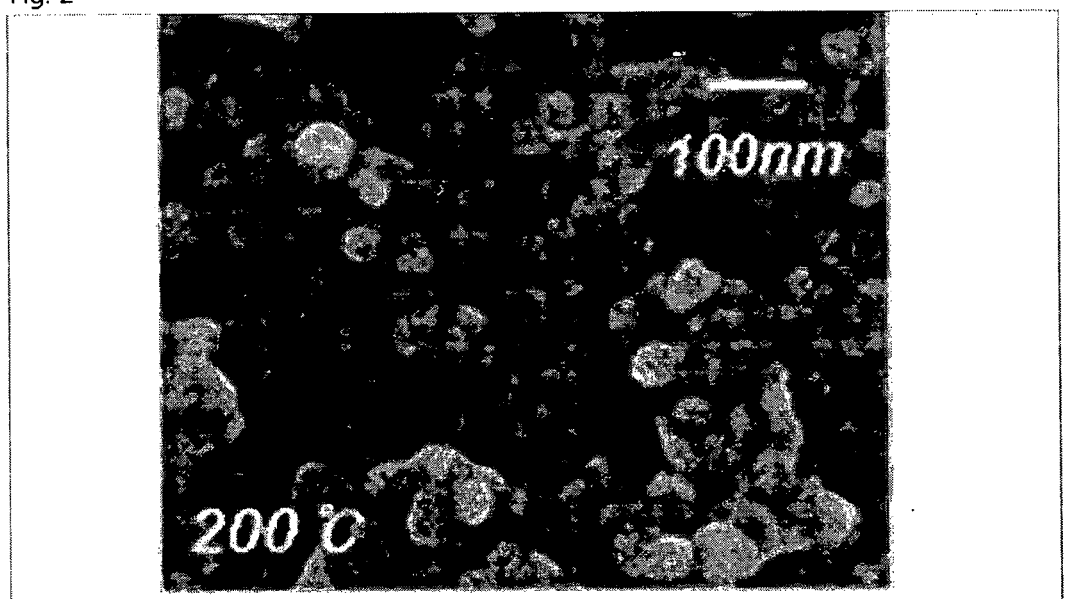
FIG. 2 is a scanning electron microscope (SEM) photograph showing a surface micro structure after heat treatment (200° C.) under the vacuum atmosphere of copper film (Comparative Example 1) to which carboxylic acid is not added.

After the heat treatment (200° C.) is performed under the vacuum atmosphere, the results obtained by observing the micro structure on the surface of the film of copper nano particle using the scanning electron microscope (SEM) were shown in FIG. 2.

Figure 9:
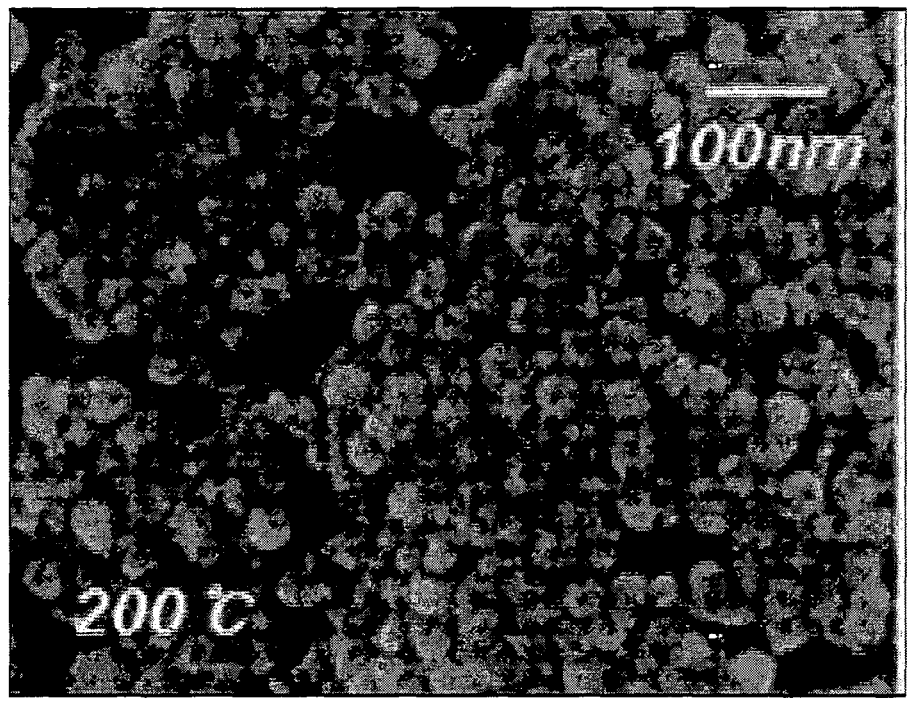
FIG. 9 is a scanning electron microscopy (SEM) photograph showing a surface micro structure after heat treatment (200° C.) under the air atmosphere of the copper film (Comparative Example 1) to which carboxylic acid is not added.

In addition, the scanning electron microscope photograph of the copper nano particle film was shown in FIG. 9.

Figure 1:
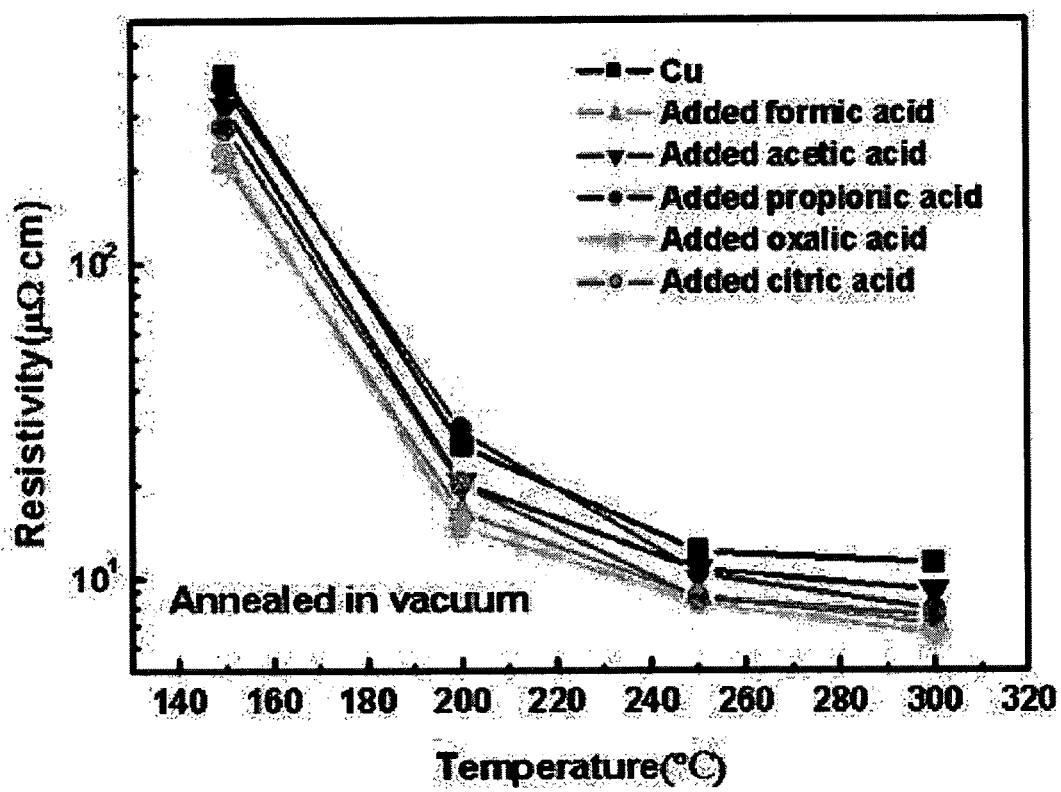
FIG. 1 is a graph showing specific resistance characteristics according to a temperature of a copper film (Comparative Example 1) to which carboxylic acid is not added and a copper film (Examples 1 to 5) to which carboxylic acid is added, at the time of heat treatment under the vacuum atmosphere according to Examples 1 to 5 and Comparative Example 1.

Comparing the case of Example 1 where the carboxylic acid was added with Comparative Example 1 where the carboxylic acid was not added, it could be appreciated from FIG. 1 that the specific resistance value of the copper nano particle was greatly reduced, which can improve the electric conductivity of the copper nano particle.

Figure 8:
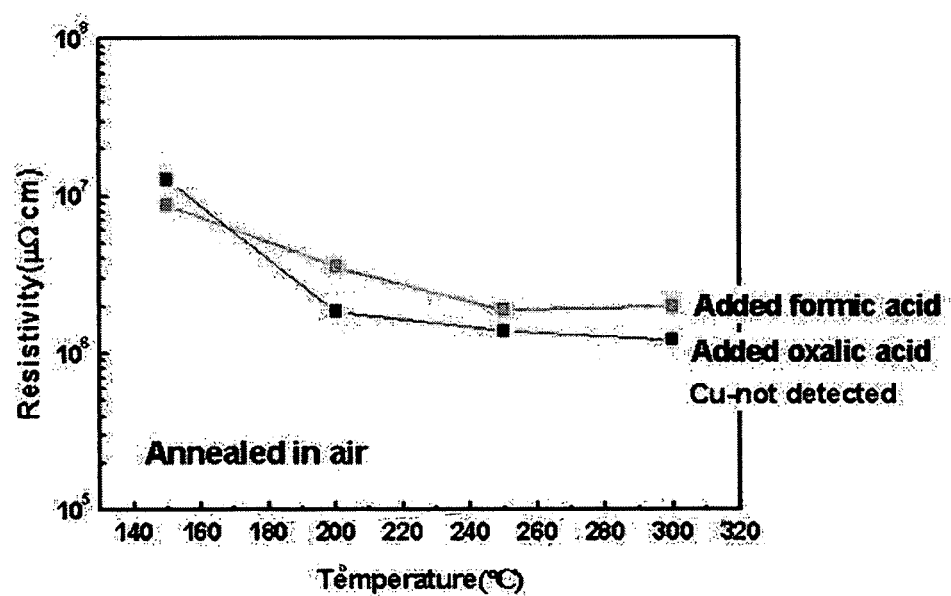
FIG. 8 is a graph showing specific resistance characteristics according to a temperature of the copper film to which formic acid and oxalic acid are added at the time of heat treatment under the air atmosphere according to Examples 1 and 4.

In addition, FIG. 8 was a graph observing the specific resistance characteristics according to the change in temperature of the film of the copper nano particle at the time of heat treatment under the air atmosphere (not under the vacuum atmosphere) when the formic acid or the oxalic acid as the carboxylic acid were added as in Examples 1 and 4, and the copper was not detected in FIG. 8.

When the carboxylic acid was added to the conductive metal nano particle dispersion, the present invention actively performed the sintering of the metal nano particle to improve the sintering property, such that it could be appreciated from FIGS. 1 to 11 that the specific resistance of the conductive metal nano particle was reduced and the conductivity was improved.

INDUSTRIAL APPLICABILITY

According to the present invention, the solution process, such as spin coating, dip coating, droplet casting, inkjet printing, screen printing, etc., all of which are simple in terms of the process and easy to form the pattern, can be applied to the metal material with the excellent conductivity. Further, the present invention can add the carboxylic acids efficient for the reduction and removal of the copper oxide to the copper based liquid-phase material, which is a low-cost material, to have the excellent conductivity by performing the low-temperature heat treatment on the copper film under the low vacuum or air atmosphere, such that it can easily apply the copper as the electrode material. Therefore, the present invention may be applied as the next-generation technology in the electric/electronic material industrial field. Further, it is expected that the present invention can be applied to various industrial fields from the ink-based technology to the bio industries such as protein biochip manufacturing, etc.

The invention claimed is:

1. A method for manufacturing a conductive metal thin film, comprising:
preparing a conductive metal coating solution by adding carboxylic acid to a dispersion including a conductive metal nanoparticle with a natural oxide layer formed on the surface and therefore having a core/shell structure, and uniformly mixing the solution using sonication and planetary milling;
coating the conductive metal coating solution on a top portion of a substrate, heat-treating it in a vacuum at 150 to 300° C. and removing the natural oxide layer on the surface of the conductive metal nanoparticle having the core/shell structure
to form a thin film of the conductive metal nanoparticle from which the natural metal oxide layer is removed,
wherein the dispersion including the conductive metal nanoparticle having the core/shell structure comprises (a) 5 to 40 wt % of conductive metal nanoparticle; (b) 50 to 90 wt % of organic solvent comprising ethylene glycol and methyl alcohol; and (c) 1 to 10 wt % of one or more dispersant selected from the group consisting of dibutyl sebacate (DBS), sodium dodecyl sulfate (SDS), sodium bis (2-ethylhexyl) sulfosuccinate (AOT), cetyltrimethylammonium bromide (CTAB), triton X-100, tween 20, poly (acrylic acid) (PAA), poly styrene-alt-maleic acid (PSM), and poly (styrene-co-acrylic acid) (PSA).

2. The method for manufacturing a conductive metal thin film of claim 1, wherein the core of the conductive metal nanoparticle having the core/shell structure is selected from copper, aluminum, nickel, cobalt, and molybdenum, and an alloy thereof.

3. The method for manufacturing a conductive metal thin film of claim 2, wherein the core of the conductive metal nanoparticle having the core/shell structure is copper.

4. The method for manufacturing a conductive metal thin film of claim 1, wherein the heat treatment uses a heat-treatment method selected from hot plate, heating air convection, IR lamp, plasma sintering, microwave sintering, and laser sintering.

5. The method for manufacturing a conductive metal thin film of claim 1, wherein the heat-treatment temperature is 150 to 250° C.

6. The method for manufacturing a conductive metal thin film of claim 1, wherein the carboxylic acid is one or more selected from saturated mono-carboxylic acid, unsaturated carboxylic acid, di-carboxylic acid, and tri-carboxylic acid.

7. The method for manufacturing a conductive metal thin film of claim 6, wherein the carboxylic acid is one or more selected from formic acid, acetic acid, propionic acid, acrylic acid, malonic acid, oxalic acid, and citric acid.

8. The method for manufacturing a conductive metal thin film of claim 1, wherein the organic solvent further comprises one or more selected from iso-propyl alcohol, deionized water, methoxyethanol, glycerol, acetone, toluene, methyl ethyl ketone, ethyl acetate, cyclohexane, butyl lactate, and butyl carbitol acetate.

9. The method for manufacturing a conductive metal thin film of claim 1, wherein the carboxylic acid is added at 0.1 to 10 wt % for the conductive metal nanoparticle having the core/shell structure.

10. The method for manufacturing a conductive metal thin film of claim 1, wherein the coating uses a coating method selected from inkjet printing, spin coating, screen printing, dip coating, droplet casting, felxo, gravure, and off-set.

\* \* \* \* \*